UNITED STATES PATENT OFFICE.

EBEN NORTON HORSFORD, OF CAMBRIDGE, MASSACHUSETTS.

IMPROVEMENT IN PREPARING FARINACEOUS FOOD.

Specification forming part of Letters Patent No. 87,850, dated March 16, 1869.

*To all whom it may concern:*

Be it known that I, EBEN NORTON HORSFORD, of Cambridge, in the county of Middlesex and State of Massachusetts, have invented a new and useful Improvement in the Preparation of Farinaceous Food; and I do hereby declare the following to be a full and exact description thereof.

The nature of my invention consists in adding to flour, otherwise rendered self-raising by the use of acid phosphate of lime or phosphoric acid as one of the constituents or ingredients, a salt of potassa, by which the potassa normal to the original grain, but separated in large measure with the bran in the process of bolting, shall be restored to the flour.

Analysis of wheat has shown that the chief inorganic base it contains is potassa, and analysis of the more important tissues and juices of the animal body shows them to contain potassa as a prominent ingredient.

Analysis of the bran and of the flour separated from each other in bolting shows that the bran contains many times as much potassa, weight for weight, as the flour.

My invention supplies this deficiency. I have already indicated in the specification of my patent of March 29, 1864, No. 42,140, the introduction of potassa as a constituent of my acid phosphate for use in the preparation of farinaceous food.

I now employ phosphoric acid and acid phosphate of lime with bicarbonate of soda, and add to the flour with which these ingredients have been mixed, in the proper proportions, such a quantity of chloride of potassium, in the form of a dry fine powder, as will restore to the flour the quantity of potassa which analysis shows it to be in need of.

I proceed as follows: I take two pounds of acid phosphate of lime, prepared in substantial accordance with the specification of my patent of April 22, 1856, No. 14,722, or my patent of March 29, 1864, No. 42,140, of such strength that twenty (20) parts shall exactly neutralize nine (9) parts of carbonate of soda, and nine-tenths ($\frac{9}{10}$) of a pound of dry carbonate of soda, and one hundred (100) pounds of flour.

These are intimately mixed as follows: The acid phosphate is mixed with the flour, then the soda is added, and the whole again thoroughly remixed. To this mixture are finally added nine (9) ounces of dry finely-ground chloride of potassium, and the whole intimately mixed again; or I add the acid phosphate and bicarbonate of soda, chloride of potassium, and chloride of sodium, if necessary, all at once, and intimately and thoroughly mix by rapid and prolonged agitation with beaters in a suitable mixer.

I sometimes use a bicarbonate of potassa instead of bicarbonate of soda to furnish the carbonic acid. In this case no chloride of potassium is added.

In adapting the use of chloride of potassium to small quantities of flour—as for domestic consumption, for example—I mix the chloride of potassium and bicarbonate of soda in one package and the equivalent of my acid phosphate in another, the two packages inclosed in one outer wrapper, and accompanied by a suitable measure for each. These powders, in equivalent quantities, mixed with a proper proportion of flour, give self-raising flour. They may also be used in raising other forms of farinaceous food.

What I have invented is the use of salts of potassa with acid phosphates, when employed with flour in making bread by the self-raising or self-leavening process; and

I claim—

The use of salts of potassa when employed with phosphoric acid or acid phosphates, in the preparation of farinaceous food, substantially as above set forth.

In testimony whereof I have signed my name to this specification before two subscribing witnesses.

E. N. HORSFORD.

Witnesses:
WM. HENRY ARNOUX,
FRED. N. DODGE.